3,080,933
DISK HARROW
Richard W. Kramer, Etna, and Reuben E. Anderson, Ripon, Calif., assignors to International Harvester Company, Chicago, Ill., a corporation of New Jersey
Filed Apr. 6, 1961, Ser. No. 101,271
3 Claims. (Cl. 172—582)

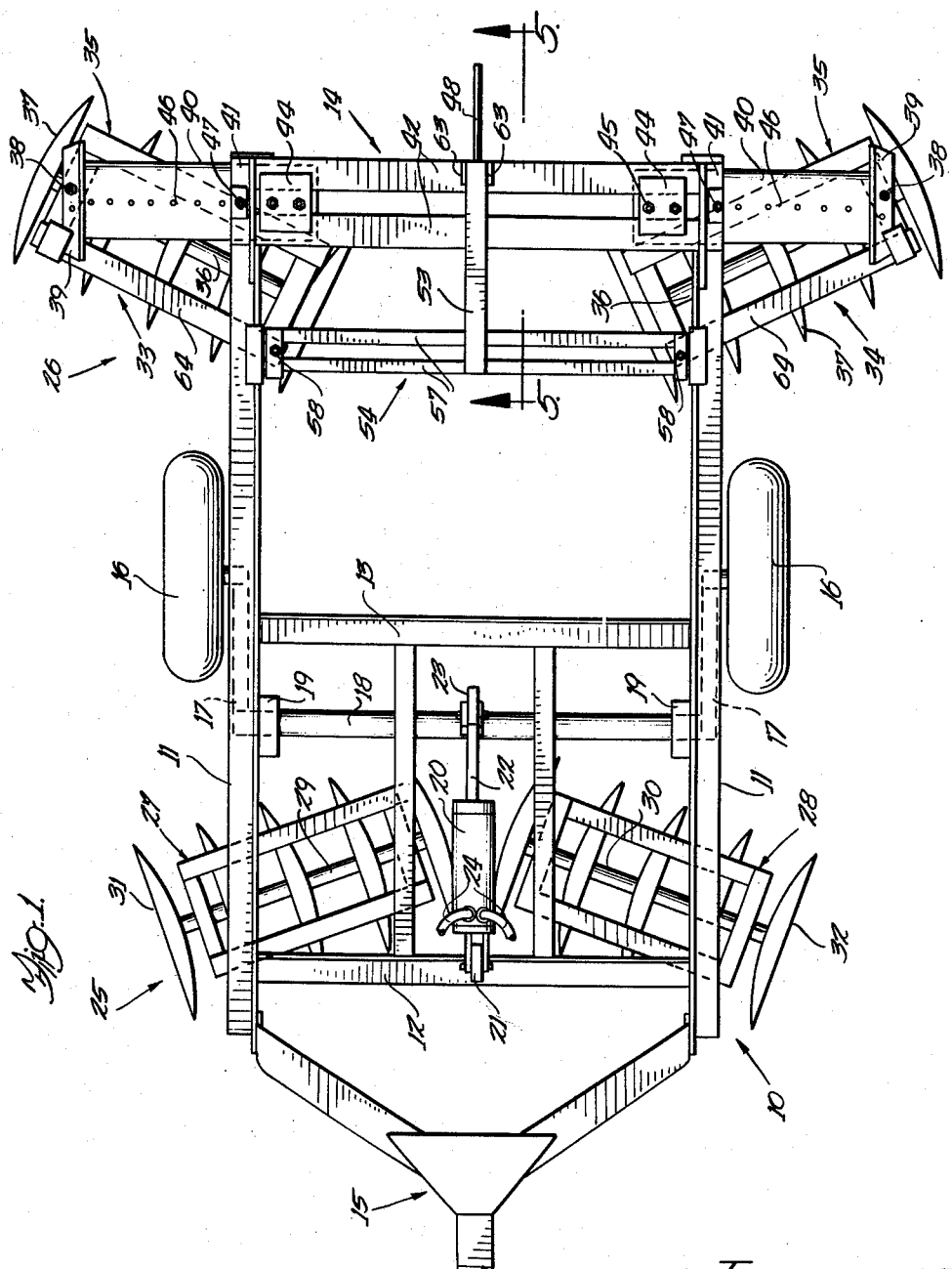

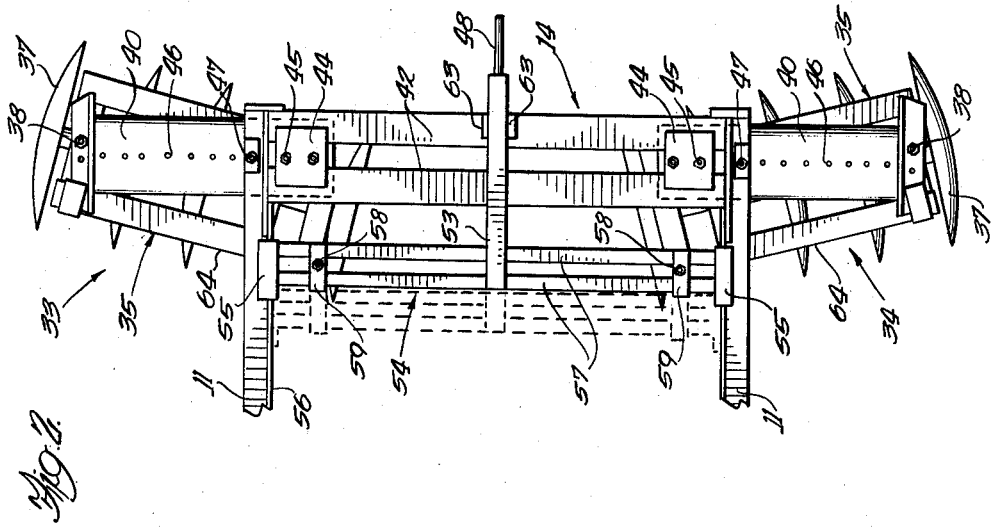
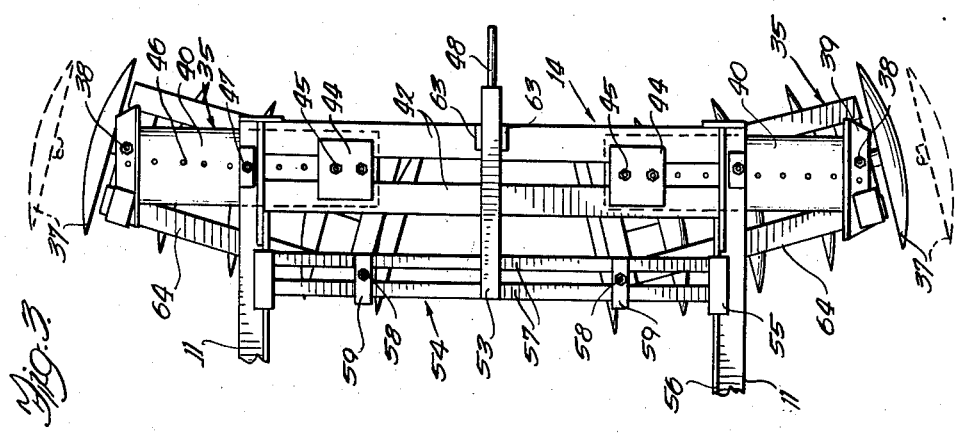

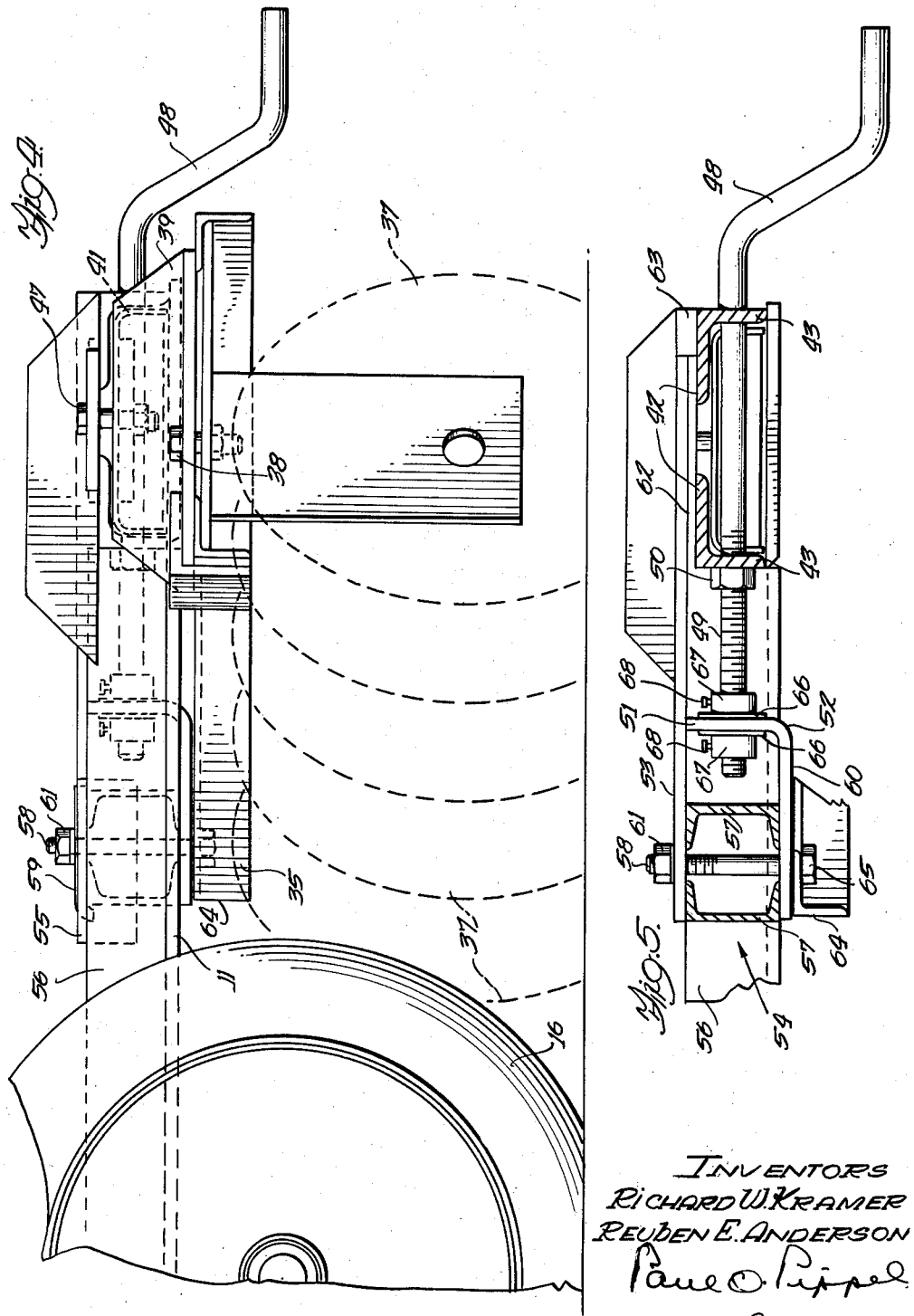

This invention relates to disk harrows and particularly to a tandem disk harrow wherein front and rear gang sections are mounted for relative angling on a supporting frame.

An object of the invention is the provision of a disk harrow of novel construction wherein means are provided for adjusting the gang sections to meet certain conditions.

A tandem disk harrow consists generally of a pair of tandem disk gang sections mounted on a frame, each section consisting of a pair of gangs which may be de-angled until their axes are in alignment for transport purposes, and in operation their relative angularity can be adjusted according to the requirements of the soil, etc., the gangs of each section, however, being placed with their inner ends in close proximity. The concave faces of the front gangs are directed outwardly and those of the rear gang inwardly for maximum tillage of the soil. However, under some orchard conditions where the harrow travels between rows, it is desirable to move soil away from the base of the vine or other plant while still cultivating the earth between the rows.

Another object of this invention, therefore, is the provision of a disk harrow of novel construction wherein means are provided for adjusting the lateral spacing between the gangs of the rear section while maintaining the front gangs in end-to-end relation and holding them in a selected adjusted position.

Another object of the invention is the provision of a disk harrow of novel construction wherein means are provided for adjusting the lateral spacing between the gangs and also for adjusting the angle therebetween.

Other objects and advantages of the invention will become clear from the following detailed description when read in conjunction with the accompanying drawings, wherein:

FIGURE 1 is a plan view of a trail-behind tandem disk harrow of the wheel-supported type, having parts removed for clarity, illustrating the disposition of opposed pairs of front and rear disk gangs on the frame.

FIGURE 2 is a plan view of a fragment of the disk harrow with the gangs disposed at a lesser angle than that shown in FIGURE 1, but with the gangs widely spaced apart;

FIGURE 3 is a view similar to FIGURE 2 with the disk gangs of the rear section disposed at the same angle as in FIGURE 2 but with the gangs closer together;

FIGURE 4 is a side elevation on an enlarged scale of a detail showing the rear end of the disk harrow of this invention, and FIGURE 5 is a section taken on the line 5—5 of FIGURE 1.

In the drawings the numeral 10 designates the frame of the tandem disk harrow of this invention comprising laterally spaced longitudinally extending angle frame bars 11 rigidly connected by transversely extending forward and intermediate angle bars 12 and 13 and a rear transverse brace member 14.

At its front end the implement is provided with a hitch 15 adapted for connection to a tractive vehicle and the entire frame is supported upon a pair of laterally spaced wheels mounted upon the ends of crank arms 17 affixed to the ends of a transversely extending shaft 18 mounted in bearings 19 carried by the frame.

The wheels 16 facilitate transportation of the disk harrow, the tool carrying frame 10 of the implement being elevated to a transport position by rocking the shaft 18 in a direction to lower the wheels with respect to the frame. This is accomplished by the provision of a hydraulic cylinder 20 pivotally anchored to a lug 21 secured to brace 12, and having a piston rod 22 slidable therein and pivotally connected to an arm 23 affixed to the shaft 18. Fluid under pressure is supplied to the cylinder 20 through hose lines 24 from a suitable source of power on the vehicle by which the implement is propelled.

The implement of this invention is a tandem disk harrow comprising front and rear disk gang sections 25 and 26, respectively. The front section 25 comprises right and lefthand, laterally spaced allochiral gangs 27 and 28 mounted on the frame 10 in any suitable way, but preferably by means, not shown, which include means for varying the angle between the gangs 27 and 28 and for adjusting the disk-carrying shafts 29 and 30 to a position in transverse alignment. It will be noted that the concave faces of the disks 31 and 32 of the respective gangs 27 and 28 face in opposite directions and in the operating position of FIGURE 1 move the soil outwardly.

The disk gangs 33 and 34 of the rear implement section 26 are substantial duplicates in reverse, and a description of one will suffice for both. Each of the gangs 33 and 34 includes a rectangular frame 35 which carries a shaft 36 upon which is mounted a plurality of disk 37, the concave faces of which are directed diagonally inwardly in the operating position shown in FIGURE to move soil inwardly.

The outer end of each gang frame 35 is connected by a pivot bolt 38 to a bracket 39 affixed to the outer end of an auxiliary frame member 40 which extends laterally outwardly from the rear end of the implement frame 10 at opposite sides thereof. Auxiliary frame member 40 serve as carriers for disk gangs 33 and 34 and each of the members 40 is in the form of a rectangular box section, the inner end of which is slidably receivable in socket member 41 affixed to the rear end of each frame bar 11.

The rear brace member 14 comprises longitudinally spaced angle bars 42 having downwardly extending flanges 43 and serving as a guide to telescopically and slidably receive the rear disk gang carrier or auxiliary frame member 40. Frame member 40 is disposed below the horizontal portions of angle bars 42 and a plate 4 engages the upper surface of the angle bars and is secure to the inner end of member 40 by bolts 45, passing through the space between the bars 42, and received in one of a plurality of openings 46 provided in auxiliary frame member 40 and extending lengthwise thereof.

At this point it should be clear that, by mounting the gangs 33 and 34 upon the auxiliary frame members 40 the gangs are laterally adjustable with respect to each other by sliding the members 40 transversely in the sockets 41 and guide formed by the members 42, to vary the lateral spacing between the gangs. As shown in the drawings, the gangs 33 and 34 can be adjusted from the farthest lateral spacing shown in FIGURES 1 and 2 inwardly to an intermediate position indicated in FIGURE 3. If desired, of course, the rear gangs can be brought together to the same spacing provided in the front gang. The gangs are held in their laterally adjusted position by the provision of a bolt 47 mounted in the socket member 41 and receivable in a selected one of the openings 46.

Adjustment of the operating angle of the gangs 33 and 34 is made by horizontally swinging them about the axes of the pivot bolts 38. Adjustment of the operating angle of the gangs or adjustment thereof to an axially aligned position is accomplished by mechanism comprising crank 48 having a longitudinally extending portion rotatably receivable in a suitable opening in the rear flange 43, and a threaded section 49 receivable in a nut 50 affixed to the forward depending flange 43. The forward end of the crank 48 is rotatably received in a suitable opening provided in the upright portion 51 of a bracket 52 affixed to a bar 53, the forward end of which is secured to the upper surface of a longitudinally shiftable member 54.

Longitudinally shiftable member 54 extends transversely between angle bars 11 of the implement frame 10 and has affixed to each end a guide member 55 adapted to rest upon the upper edge of the upright flange portion 56 of frame bar 11 and provides support for the slidable member 54.

Member 54 is generally square in cross-section, comprising a pair of longitudinally spaced channel members 57 spaced apart as clearly shown in FIGURE 5 to receive a bolt 58, the upper end of which has mounted thereon a slide member 59, the ends of which are bent downwardly to partly embrace the upper edge of member 54. An arm 60 of bracket 52 is secured to the lower surface of member 54. The upper end of bolt 58 is threaded and provided with a nut 61.

A tie bar 62 is affixed to the upper surface of and connects bars 42 centrally thereof and this tie bar is slidably engaged by the guide bar 53, the rear end of which is received between and held against lateral displacement by a pair of lugs 63 affixed to and projecting upwardly from the rearmost angle bar 42 of brace 14.

The lower end of bolt 58 also passes through the horizontal flange portion of an angle bar 64 engaged by the head 65 of the bolt, at the inner end of the frame 35, bolt 58 forming a pivotal connection between the shiftable member 54 and the disk gang frame 35.

The pivotal connection of bolt 58 with the disk gang and the sliding connection thereof through bolt 58 with shiftable member 54 allows the gangs 33 and 34 to be angled and de-angled by longitudinal shifting of member 54 on the harrow frame. This longitudinal shifting of member 54 is accomplished by revolving the crank 48, the forward end of which is rotatably held with respect to bracket 52 by the provision of washers 66, collars 67 and set screws 68 to hold the collars in place. Adjustment of the crank in nut 50 causes the entire crank, shiftable member 54 and guide bar 53 to be moved longitudinally as indicated in dotted lines in FIGURE 2 to vary the angle of the disk gang from a position such as that shown in FIGURE 1 to that of FIGURE 2.

The sliding of member 59 carrying bolt 58 relative to shiftable member 54 compensates for adjustments made in the lateral spacing between the disk gangs by telescoping of the auxiliary frame members 40 relative to the main frame 10.

It is believed that the construction and operation of the novel tandem disk harrow of the present invention will be clearly understood from the foregoing description.

It should likewise be understood that the invention has been described in its preferred embodiment and that modifications may be made therein without departing from the spirit of the invention or the scope of the appended claims.

What is claimed is:

1. In a disk harrow, a generally rectangular frame including laterally spaced longitudinally extending frame bars, a transverse guide member mounted on the frame, laterally spaced disk gang units mounted on the frame, each said unit comprising a carrier telescopically receivable in one end of said guide member and slidable relative thereto from an extended position projecting laterally from the frame to a retracted telescoped position in said guide member, a disk gang pivotally mounted on the carrier for angling in a horizontal plane relative thereto, means mounted on the frame and operatively connected to said gangs for adjusting the angle thereof and holding them in a selected adjusted position, said last mentioned means comprising a transversely extending longitudinally shiftable member mounted on the frame, transversely slidable pivot means slidably connecting said shiftable member to both said gangs for simultaneously angling the gangs upon shifting of the shiftable member, and a single adjusting means operatively connected between the frame and said shiftable member for shifting the latter.

2. The invention set forth in claim 1, wherein said pivot means is slidable laterally relative to said longitudinally shiftable member and simultaneously with the shifting of the latter to compensate for the lateral adjustment of the disk gang carrier.

3. In a disk harrow, a generally rectangular frame including laterally spaced longitudinally extending frame bars, laterally spaced disk gang units mounted on the frame, each of said units comprising a carrier laterally movable relative to the frame and the other carrier, a disk gang pivotally mounted adjacent one end on the carrier for angling in a horizontal plane relative thereto, means cooperative between the frame and each of said carriers for holding them in a selected adjusted position, a transversely extending longitudinally shiftable member mounted on the frame, transversely slidable pivot means slidably connecting the other end of each of said gangs to said shiftable member to accommodate lateral shifting of said pivot means relative to said shiftable member simultaneously with the lateral movement of said carriers, and adjusting means mounted on the frame and operatively connected to said shiftable member for shifting the latter to angle the gangs.

References Cited in the file of this patent
UNITED STATES PATENTS

| 358,838 | Chandler | Mar. 8, 1887 |
| 799,012 | Lindgren | Sept. 5, 1905 |
| 2,897,905 | McClesky | Aug. 4, 1959 |